Aug. 28, 1956  H. N. DUNNING  2,760,848
MANUFACTURE OF SULFUR
Filed Sept. 29, 1953
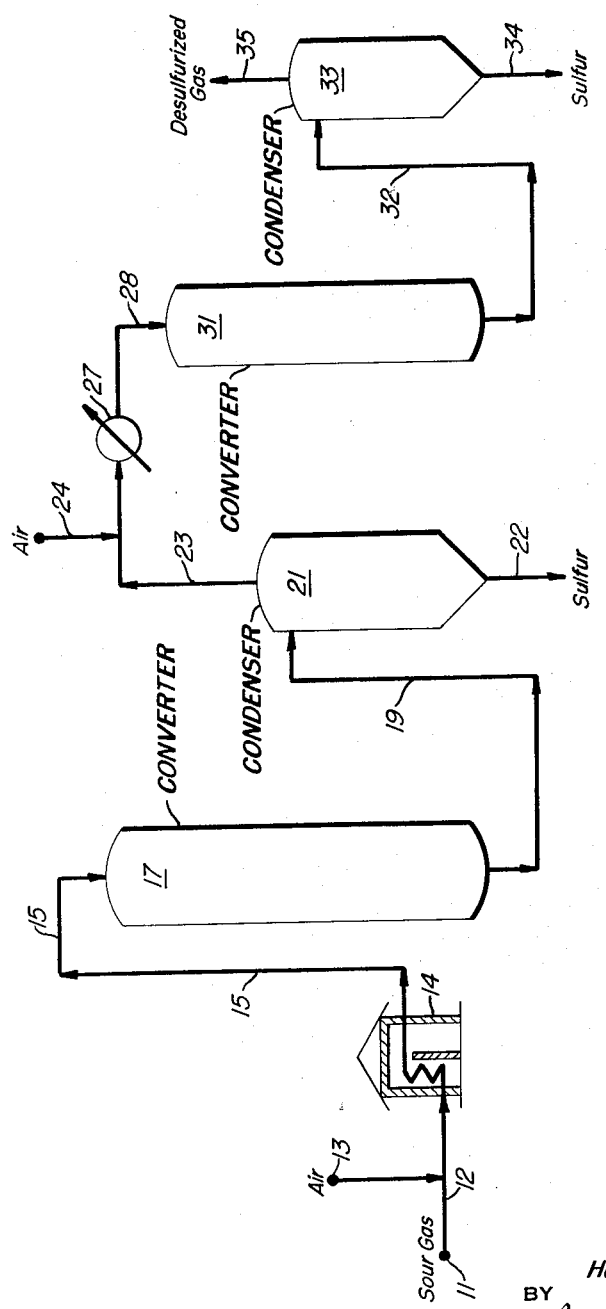
INVENTOR
Herbert N. Dunning
BY
*Joseph C. Kotarski*
ATTORNEY

United States Patent Office 2,760,848
Patented Aug. 28, 1956

2,760,848

MANUFACTURE OF SULFUR

Herbert N. Dunning, Bartlesville, Okla., assignor to Standard Oil Company, Chicago, Ill., a corporation of Indiana Application September 29, 1953, Serial No. 383,103

12 Claims. (Cl. 23—225)

This invention relates to a method for the manufacture of free sulfur from gaseous streams containing hydrogen sulfide. More particularly it relates to a process for the manufacture of free-sulfur from gaseous streams containing hydrogen sulfide and hydrocarbons to produce a product gaseous stream containing hydrocarbons and having a lowered hydrogen sulfide content.

There are available to industry many gaseous streams containing hydrogen sulfide and hydrocarbons in varying proportions. However, industry ordinarily desires the gaseous stream to contain one component to the complete or substantially complete exclusion of the other. Petroleum refiners, natural gas producers, gas transmission companies, and related industries desire gaseous streams comprising essentially hydrocarbons, hydrogen etc., for further processing or sale or use as fuel. The presence of hydrogen sulfide in such streams is objectionable from the standpoint of odor, corrosion, and atmospheric pollution especially when burned as fuel since the hydrogen sulfide is oxidized to the noxious and more corrosive sulfur dioxide. In addition, it may render such streams nonsuitable for further industrial processing to other valuable products since the hydrogen sulfide often causes processing difficulties and increased costs. This problem has led to the utilization of methods for the removal of hydrogen sulfide from such streams. The principal methods employed have been absorption processes wherein liquid solutions such as alkanolamines or alkaline phosphates are employed as absorbents for the acidic contaminants such as hydrogen sulfide. The gaseous stream comprising essentially hydrocarbons and containing hydrogen sulfide is passed through the absorbent and recovered substantially free of hydrogen sulfide and ready for further processing or sale. The absorbent solution is regenerated for further use by springing the acidic gases therefrom.

In recent years, due to shortages of sulfur, the interest in hydrogen sulfide as a source material for the manufacture of sulfur has increased tremendously. The sprung acid gases containing hydrogen sulfide have provided suitable feeds for conversion to sulfur. This has been accomplished commercially by passing approximately one-third of the sprung acid gas through a furnace together with air in quantity sufficient to oxidize the hydrogen sulfide to sulfur dioxide, combining the resultant gaseous mixture with the remaining two-thirds of the acid gas and passing the mixture through one or more converters containing bauxite catalyst. The reaction occurring in the furnace is as follows:

(1) 

The reaction which occurs in the converters is:

(2) 

The reaction in the converters is highly exothermic and the hot converter effluent gases are cooled to condense the sulfur vapors.

It is readily apparent from the above general description of the commercial method generally employed today for the manufacture of sulfur that a process wherein the hydrogen sulfide could be oxidized directly to sulfur without oxidation of the hydrocarbons, hydrogen, etc. also present, would be most attractive to industry from the standpoint of investment and operating cost. The reaction occurring is as follows:

(3) 

Because the reaction as illustrated by Equation 2 is relatively slow compared to the reaction illustrated by Equation 3, i. e. the direct oxidation of hydrogen sulfide to sulfur, the converters employed in the previously described process commercially employed today are necessarily much larger than those required in the direct oxidation of hydrogen sulfide to obtain an equivalent quantity of product sulfur. Investment cost, based upon a gaseous stream containing 15% hydrogen sulfide, for this single step direct oxidation has been calculated to be about 60% of that required for the previously described commercial operation wherein the two steps of (1) absorption of hydrogen sulfide from gaseous streams containing hydrocarbons followed by (2) oxidation of sprung acid gas to produce sulfur are practiced. The cost ascribed to the absorption process is seen to be high and its elimination a goal greatly desired. Attempts have been made in the past to obtain an operable process of this desired type, but none have been satisfactory. Either the hydrocarbons are oxidized, the sulfur is of unacceptable quality, or the catalyst quickly becomes deactivated. If bauxite is employed as a catalyst for the selective oxidation of hydrogen sulfide to sulfur in the presence of paraffinic hydrocarbons, some hydrocarbon oxidation occurs at ordinary operating conditions such as 800° F., and at somewhat higher operating temperatures, for example about 1000 to about 1100° F., hydrocarbon oxidation is a substantial part of the reaction. It is also observed that at these higher operating temperatures of about 1000 to about 1100° F. the sulfur produced is of unacceptable quality due to its foul odor and darkened color.

When a gaseous stream containing hydrogen sulfide and olefins is passed together with air over the bauxite catalyst, operating difficulties become extreme. The bauxite catalyst is rapidly deactivated by heavy polymer or coke. The sulfur produced is discolored and is not suitable for sale. A very important problem is that the catalyst must be discarded since attempts to regenerate it for further use have been unsuccessful.

An object of this invention is a novel catalytic process useful for the selective oxidation of the hydrogen sulfide contained in the gaseous streams which also contain hydrocarbons. Another object of this invention is a novel catalytic process for the selective oxidation of the hydrogen sulfide contained in gaseous streams which contain olefinic hydrocarbons, wherein the catalyst is not deactivated by fouling or coking due to the presence of said olefinic hydrocarbons. A further object is an efficient economical catalytic conversion process which is selective for the oxidation of hydrogen sulfide contained in gaseous streams which contain hydrocarbons, to produce a hydrocarbon gas of lowered hydrogen sulfide content and free of elemental sulfur. An important object is the recovery of free-sulfur from a gaseous stream comprising essentially hydrogen sulfide and hydrocarbons. Other objects will become apparent in the course of the detailed description of the invention.

It has been found that these and other objects are achieved by contacting the gaseous stream comprising hydrogen sulfide and hydrocarbons with a catalyst consisting essentially of an intimate mixture of a metal hydroxide selected from the group consisting of sodium and potassium and a metal oxide selected from the group consisting of magnesium, calcium, and barium, in the presence of an oxidizing agent selected from the group consisting of free-oxygen and sulfur dioxide, wherein the temperature of contact of said gaseous stream, said oxidizing agent, and said catalyst is at least sufficient to cause reaction of said hydrogen sulfide and said oxidizing agent to form free-sulfur.

The aforesaid mixture of metal hydroxide and metal oxide which is employed in the process of this invention consists essentially of from about 5% to about 95% by weight of a metal hydroxide selected from the group consisting of sodium and potassium and from about 5% to about 95% by weight of a metal oxide selected from the group consisting of magnesium, calcium, and barium. The catalytic mixture may consist essentially of mixtures of both sodium hydroxide and potassium hydroxide in combination with one or more of the metal oxides selected from the group consisting of magnesium, calcium, and barium, or it may consist essentially of a mixture of one metal hydroxide and one metal oxide selected from the above described groups. Approximately equal amounts of the metal hydroxide and the metal oxide may be employed, but a mixture of from about 5% to about 15% by weight of the metal hydroxide and from about 95% to 85% by weight of the metal oxide is preferred. It has also been found that a mixture of from about 5% to about 15% by weight of sodium hydroxide with from about 95% to about 85% by weight of calcium oxide is a very suitable catalyst for this process. This latter composition is available commercially by the name soda lime, and is commonly prepared by slaking quick lime (calcium oxide) with caustic soda (sodium hydroxide) and drying the product. An intimate mixture of the metal hydroxide with the metal oxide is desired and may be obtained by mixing finely divided metal oxide with the aqueous solution of sodium hydroxide or potassium hydroxide followed by drying of the mixture and grinding it, if necessary, to obtain the intimate mixture in a finely divided form. The more intimate the mixture and the smaller the particle size, the greater appears to be the catalytic effect.

It has been demonstrated that the catalytic activity of either a metal hydroxide selected from the group consisting of sodium and potassium or a metal oxide selected from the group consisting of magnesium, calcium, and barium, when employed alone is not nearly as great as the catalytic activity of mixtures of a metal hydroxide with a metal oxide selected from the above described groups, when the aforesaid compounds are employed as catalysts for the oxidation of hydrogen sulfide to sulfur. For example, laboratory demonstrations have shown that if hydrogen sulfide and air are passed at room temperature through potassium hydroxide solution or potassium hydroxide pellets, there is no apparent formation of sulfur. Likewise if hydrogen sulfide and air are passed at room temperature through finely divided magnesium oxide, there is no apparent reaction to form sulfur. However, if hydrogen sulfide and air are passed over a mixture of potassium hydroxide with magnesium oxide, heat is evolved and an incandescent glow spontaneously develops. The reaction proceeds so long as the hydrogen sulfide and air are passed through the catalytic mixture. The temperature of the glowing catalyst has been measured to be about 1800° F., and since the reaction of hydrogen sulfide with oxygen to produce sulfur is highly exothermic, the very high temperature produced within the catalyst provides a qualitative indication of its high activity for the reaction. From further investigations it appears that there is an increase in the catalytic activity of the mixture of metal hydroxide and metal oxide when the atomic number of the metal employed in the metal hydroxide increases and the atomic number of the metal employed in the metal oxide decreases, when mixtures of the metal hydroxide and metal oxide selected from the groups previously described are employed for the oxidation of hydrogen sulfide to sulfur. It has also been shown that if a gaseous stream consisting essentially of hydrogen sulfide, paraffinic and olefinic hydrocarbons, and some hydrogen is passed through a bed of magnesium oxide particles and at temperatures about as high as 1000° F., there is only a minor conversion of hydrogen sulfide to sulfur, whereas if a mixture of a metal hydroxide selected from the group consisting of sodium and potassium and a metal oxide selected from the group consisting of magnesium, calcium, and barium, had been used in place of the magnesium oxide a high degree of conversion of the hydrogen sulfide to sulfur would have been obtained.

Suitable feeds to this process are gaseous streams comprising hydrogen sulfide, hydrocarbons, and sometimes hydrogen; for example, such gaseous streams may contain between about 0.5 and about 95 volume percent hydrogen sulfide, the remainder consisting primarily of hydrocarbons with varying amounts of impurities such as nitrogen, carbon dioxide, etc. It is preferred to employ gaseous feed streams which are relatively free of impurities such as carbon dioxide etc., but such streams are not always readily available and the process of this invention may be employed upon gaseous feed streams containing such impurities. The hydrocarbons present may consist of paraffins, olefins, or their mixtures. Suitable gaseous feed streams which are available commercially are sour natural gas, sour refinery gas, etc. Most of the available sour natural gas is of low hydrogen sulfide content which may range from about 2.0% by volume down to about 0.5% by volume or less; however, natural gas obtained from certain wells may have the extremely high hydrogen sulfide content of about 60% by volume or higher. Sour natural gas of the above-mentioned types may suitably be employed as the gaseous feed stream for this process. Sour natural gas of low hydrogen sulfide content has value chiefly in the hydrocarbons present and in employing such a gaseous feed stream, the process of this invention is useful primarily in purifying the natural gas, the sulfur produced from the hydrogen sulfide being a saleable by-product. If the natural gas has a high content of hydrogen sulfide such that its value lies chiefly in the sulfur content, the process of this invention is useful in providing an economical single-step method whereby substantial quantities of sulfur are produced and a natural gas suitable as fuel is obtained as by-product material.

The petroleum refining industry produces enormous amounts of fuel gas containing varying amounts of hydrogen sulfide, dependent upon the sulfur content of the crude oil processed by the particular refinery. The hydrogen sulfide content of such fuel gases may vary between about 2 and about 10 percent by volume, and in certain instances the hydrogen sulfide may comprise the predominant portion of the fuel gas because of the arrangement of refinery gas collecting systems. Much of the refinery fuel gas is produced as a by-product of the catalytic cracking of gas oil to high octane gasoline, and the continuing expansion of catalytic cracking facilities produces ever increasing amounts of feul gas. A typical analysis of the fuel gas recovered as by-product from a gas oil catalytic cracking operation is as follows:

| | Percent |
|---|---|
| Hydrogen | 13.8 |
| Nitrogen | 10.3 |
| Carbon Dioxide | 2.5 |
| Hydrogen Sulfide | 6.3 |
| Methane | 27.0 |
| Ethylene | 8.1 |
| Ethane | 13.3 |
| Propylene | 11.3 |
| Propane | 4.6 |
| Butanes | 0.9 |
| Butylene | 1.1 |
| C$_5$ and higher | 0.8 |
| Total | 100.0 |

If the hydrogen sulfide is allowed to remain in the fuel gas, equipment corrosion problems are encountered in its use and atmospheric pollution is increased. It is apparent, therefore, that large amounts of sulfur could be produced from the hydrogen sulfide content of such a gas and its quality as fuel could also be improved. Certain other refinery gases which contain hydrogen sulfide are also available as the gaseous feed stream to the process of this invention. Certain of these gas streams are the hydrogen recycle gas from the catalytic hydroforming of virgin naphthas and the hydrogen recycle gas employed in the catalytic hydrodesulfurization of petroleum. These two hydrogen recycle gases gradually accumulate amounts of hydrogen sulfide which are produced during catalytic hydroforming or hydrodesulfurization process by destruction of the sulfur compounds in the petroleum feed. The hydrogen sulfide which is thus produced is recovered as a contaminant in the hydrogen recycle gas. Purification means must be employed to eliminate or lower substantially the hydrogen sulfide content in order to permit reuse of the hydrogen recycle gas. The hydrogen recycle gas from the catalytic hydrodesulfurization of petroleum oils may typically contain:

|  | Percent |
|---|---|
| Hydrogen | 63.1 |
| Nitrogen | 5.7 |
| Carbon monoxide | 4.6 |
| Hydrogen sulfide | 13.1 |
| Methane | 9.6 |
| Ethane | 0.9 |
| Propane, butane, pentane | 2.0 |
| Propylene, butylene, pentene | 0.7 |
| Hexane and higher | 0.3 |
| Total | 100.0 |

The oxidizing agents which may be employed in this process are free-oxygen or a gas containing free-oxygen such as air, or sulfur dioxide. In this invention the catalyst and processing conditions are such that the hydrogen sulfide present in the gaseous feed is selectively oxidized, whereas the hydrocarbons and any hydrogen which may be present are not attacked to any considerable extent by the oxidizing agent. Normally air would be the most economical oxidizing agent, but the use of air results in the presence of nitrogen in the purified hydrocarbon gases, and if premium quality natural gas or fuel gas are desired for further processing or for sale, it may be preferable to use relatively pure oxygen. If desired, sulfur dioxide may be employed as the oxidizing agent, and it is the preferred oxidizing if the gaseous stream being processed consists primarily of hydrogen and hydrogen sulfide with some hydrocarbons since the use of free-oxygen or air might result in explosion hazards. However, when the natural gas or fuel gas employed as a feed to this process contains relatively large amounts of hydrogen sulfide or if the feed is being processed primarily for the production of sulfur rather than the manufacture of a purified hydrocarbon gas, it is preferred to use air. The choice of oxidizing agent will therefore vary with the primary product desired, with the hydrogen sulfide content of the gaseous feed stream, and with the concentration of any hydrogen present in the gaseous feed stream.

The amount of oxidizing agent will vary with the extent of hydrogen sulfide conversion desired. For example, as little as about 10% or less of the stoichiometric amount of oxidizing agent for conversion of hydrogen sulfide to free-sulfur may be employed. Amounts larger than the stoichiometric amount may be employed but as the excess amount approaches 50%, an adverse effect on the direction of hydrogen sulfide oxidation occurs, i. e., sulfur dioxide appears in the effluent gas in significant amounts. It is preferred to employ approximately the stoichiometric amount required, i. e., between about 90% and about 110%.

The temperature of contact of the gaseous feed stream and the oxidizing agent with the catalyst should be in excess of about 300° F., preferably above about 350° to 400° F., to achieve oxidation of the hydrogen sulfide to free-sulfur. The reaction proceeds more rapidly at higher temperatures, however, and it has been observed that extremely high reaction rates are obtained when passing relatively pure hydrogen sulfide and air through soda lime at temperatures as high as 1800° F. for the production of free-sulfur. In the presence of hydrocarbons it is preferred to operate at temperatures below about 1000° to 1200° F. It is preferred to operate at temperatures such that the temperature of the catalyst is above the dew point of the sulfur vapors formed and usually lower than about 1000° to 1200° F. The dew point temperature will, of course, vary with the concentration of sulfur vapors in the gaseous effluent, but it is usually of the order of about 400° F. The aforementioned contacting temperature may be attained by pre-heating the gaseous feed stream, the oxidizing agent, or their mixture to at least about 300° F. and preferably at least about 350° to 400° F., prior to passage through the catalyst. If the concentration of hydrogen sulfide in the gaseous feed stream is high, e. g. 40% by volume of hydrogen sulfide, the large amount of heat produced by reason of the exothermic conversion of hydrogen sulfide to sulfur may be so great that the pre-heat temperature of the gas passed through the catalyst may be lowered, or the pre-heating step may possibly be eliminated, thus partially or completely relying upon the heat of reaction to maintain the temperature of contact of the entering gases with the catalyst above about 350° to 400° F. It is preferable, however, to pre-heat the gases to about 400° F. prior to their passage through the catalyst.

Control of the temperature of the process is often a serious problem. The oxidation of hydrogen sulfide to produce sulfur is a highly exothermic reaction, and it is readily apparent that if a gaseous feed stream consisting essentially of hydrocarbons, hydrogen, etc., and large amounts of hydrogen sulfide is passed together with oxidizing agent through the catalyst wherein the contacting temperature is in excess of about 300° F., the heat produced by the reaction will rapidly increase the temperature of the catalyst. Heat exchange means must therefore ordinarily be installed within the converter which contains the catalyst. There are other means for controlling the temperature within the converter containing the catalyst. For example, the catalyst may be diluted with an inert material such as sand, or the gases entering the converter may be diluted with some inert gas. Another technique for controlling the temperature is to employ a two-stage conversion process with cooling of the gases between the stages. This is accomplished by introducing about 50% to about 75% of the oxidizing agent theoretically necessary for complete conversion of the hydrogen sulfide to sulfur with the gaseous feed stream into the first conversion stage, cooling the total product, then adding the remaining amount of oxidizing agent theoretically necessary, and passing the mixture through the second catalytic conversion stage. The intermediate cooling step will extract large amounts of heat. If desired, the intermediate cooling may be such that sulfur vapors are condensed and removed from the system, but in such instance it will be necessary to pre-heat the gases prior to their entry to the second catalytic conversion stage.

Space velocities ranging between about 700 and about 50,000 volumes gas/hr./volume catalyst may be employed, dependent upon the hydrogen sulfide content of the gaseous feed. When the gaseous feed contains about 15% hydrogen sulfide, space velocities of about 1000 to about 10,000 volumes gas/hr./volume catalyst are preferred.

The product sulfur produced in accordance with the process of this invention is of good color and is not contaminated with foul smelling impurities. The effluent gases from the sulfur condenser are suitable for further industrial processing or for use as fuel gas.

In order to show the results obtainable by the process of this invention, certain illustrative experimental data are presented. The following data are illustrative of the yields of sulfur obtainable. The data were obtained by passing relatively pure hydrogen sulfide with air, in slightly less than the stoichiometric amount required for conversion of the hydrogen sulfide to free-sulfur, through a tube packed with 60 milliliters of commercially purchased soda lime containing about 10% by weight of sodium hydroxide and about 90% by weight of calcium oxide. The reaction was conducted at a temperature above the dew point of the sulfur vapors. The total effluent gas was passed through two gas traps connected in series and immersed in liquid nitrogen, in which traps the sulfur was condensed and collected.

| Run | Moles Air | Moles Hydrogen Sulfide | Space Velocity [1] | Yield of Sulfur, [2] percent |
|---|---|---|---|---|
| 1 | 0.98 | 0.505 | 37,200 | 89.5 |
| 2 | 0.56 | 0.224 | 35,000 | 83.7 |
| 3 | 0.56 | 0.290 | 4,200 | 92.3 |
| 4 | 0.56 | 0.287 | 4,100 | 97.6 |

[1] In volumes of total gas/hr./volume of catalyst.
[2] Percentage of theoretical yield based upon hydrogen sulfide or air, whichever is present in less than the stoichiometric quantity.

It has been demonstrated in the above data that high yields of free-sulfur are produced. So long as only the stoichiometric amount of air, or less, was employed only trace amounts of sulfur dioxide were identifiable in the effluent gas.

In the following set of data a sour refinery gas was treated for the removal of hydrogen sulfide and the manufacture of sulfur. The data were obtained by passing a mixture of sour refinery gas together with oxidizing agent, in excess of the stoichiometric amount required for conversion of the hydrogen sulfide to free-sulfur, through a tube packed with 40 milliliters of commercially purchased soda lime containing about 10% by weight of sodium hydroxide and about 90% by weight of calcium oxide. The tube packed with catalyst was placed within a small furnace to maintain it at the desired temperature. The effluent gases were cooled and then analyzed for their content of hydrogen, carbon monoxide, carbon dioxide, hydrocarbons, excess oxidizing agent, and hydrogen sulfide. Data were thus obtained regarding the extent of oxidation of the hydrocarbons introduced in the sour refinery gas. The data appear in the table which follows.

curred even though an extreme excess of oxidizing agent was present in Run #5 wherein 7.54 times the theoretical amount of oxidizing agent was employed. No visible contamination of the catalyst with polymer or coke was noted even though a total of 59.8 liters of sour fuel gas were processed through the 40 ml. of soda lime. There was no indication of catalyst deactivation.

Additional experiments were conducted upon a gaseous stream containing hydrogen sulfide and large amounts of hydrogen. In these experiments the oxidizing agent for the hydrogen sulfide was sulfur dioxide. It is preferred over free-oxygen or air because of the explosion hazards when employing free-oxygen or air with a gaseous feed stream of this type. The mixture of hydrogen sulfide, hydrogen and sulfur dioxide was passed through a tube packed with 10 grams of commercially-purchased soda lime, said soda lime containing about 10% by weight of sodium hydroxide and about 90% by weight of calcium oxide. The tube packed with catalyst was contained within a furnace to maintain the desired temperature. The total effluent gas was cooled to condense and recover the vapors of sulfur contained therein. The data obtained in these experiments is set out below.

| Run | Feed Composition | Temp., °F. | Moles $H_2S$ | Moles $SO_2$ | Space Velocity [1] | Yield of Sulfur, [2] percent |
|---|---|---|---|---|---|---|
| 10 | 14.9 vol. percent $H_2S$<br>85.1 vol. percent $H_2$ | 610 | 0.265 | 0.113 | 17,200 | 61 |
| 11 | 15.4 vol. percent $H_2S$<br>84.6 vol. percent $H_2$ | 680 | 0.221 | 0.393 | 13,000 | 57 |

[1] Space velocity in volumes total gas/hr./volume catalyst.
[2] Yield in percent of theory based upon hydrogen sulfide or sulfur dioxide, whichever is present in less than the stoichiometric requirement.

The yield of sulfur obtained in the experiments set forth above could have been increased by employing a second conversion stage. These data demonstrate the applicability of the invention to hydrogen recycle gas streams which have become contaminated with hydrogen sulfide during the course of catalytic hydroforming or desulfurization.

The invention is further described in relation to the annexed figure which forms a part of the specification. This figure shows one illustrative embodiment of the process of this invention. Numerous pumps, valves, and other items have been omitted from the embodiment for purposes of clarity; these items may readily be added by those skilled in the art.

The feed to this embodiment is a sour refinery gas which contains about 15% by volume of hydrogen sul-

| Run | | 5 | 6 | 7 | 8 | 9 |
|---|---|---|---|---|---|---|
| Temperature, °F | | 660 | 660 | 660 | 760 | 760. |
| Vol. Sour gas, liters | | 24.8 | 9.9 | 9.0 | 9.9 | 6.2. |
| Oxidizing agent | | air | air | sulfur dioxide | air | air. |
| Vol. Oxidizing agent/vol. sour gas | | 0.42 | 0.25 | 0.33 | 0.31 | 0.34. |
| Space velocity [1] | | 2,300 | 1,250 | 1,200 | 1,400 | 1,300. |
| Catalyst | | Fresh | From Run 5 [2] | From Run 6 | From Run 7 | From Run 8. |
| Analysis: [3] | Feed | | | | | |
| Hydrogen | | | | | | 2.5. |
| Carbon Monoxide | 0.7 | 0.4 | 0.4 | 1.2 | 0.1 | 1.2. |
| Carbon Dioxide | 0.4 | | | 0.4 | | 0.1. |
| Ethane | 1.1 | 1.0 | 0.5 | 0.4 | 0.7 | 0.9. |
| Propylene | 52.3 | 53.5 | 51.7 | 46.6 | 53.8 | 50.5. |
| Propane | 42.1 | 44.2 | 45.4 | 48.6 | 43.7 | 42.8. |
| Butane | 1.0 | 0.8 | 1.1 | 1.7 | 1.2 | 1.8. |
| Butene | 0.1 | | 0.2 | 0.8 | 0.1 | 0.4. |
| $C_5$ and higher | 0.1 | | 0.2 | 0.5 | 0.3 | |
| Hydrogen Sulfide | 2.23 | 0.0 | 0.0 | trace | 0.0 | 0.0. |

[1] In volume total gas/hr./volume catalyst.
[2] In Run 6, catalyst from Run 5 which had been saturated with hydrogen sulfide and then flushed with air was employed.
[3] Mole percentage basis, corrected for nitrogen and excess air.

It will be noted from the analysis of the gaseous products that essentially no oxidation of the hydrocarbons ocfide, about 20% by volume of olefins, trace amounts of hydrogen, carbon monoxide, and carbon dioxide, and the remainder paraffinic hydrocarbons. The sour refinery gas is passed from source 11 into line 12. Air from source 13 is passed into line 12 where it becomes mixed with the sour refinery gas. The amount of air introduced into line 12 from source 13 is about 75% of that theoretically necessary to convert the hydrogen sulfide present in the sour refinery gas to sulfur. The mixture of gases is passed through line 12 and through heater 14 wherein it is heated to a temperature of about 450° F. If desired, either the sour refinery gas or the air may be heated prior to mixing with the other gaseous stream. When operating on streams containing relatively small amounts of hydrogen sulfide it may be necessary to heat only the sour gas since only small quantities of air need be employed. The gaseous mixture from heater 14 is passed through line 15 into the top of converter 17 which contains a catalytic mixture consisting essentially of an intimate mixture of about 5% by weight of sodium hydroxide and about 95% by weight of calcium oxide. The catalyst is disposed in a single bed and heat exchangers are contained within the converter to maintain the temperature of the effluent gaseous stream below about 1000° F. The space velocity of the mixture of gases entering converter 17 is about 10,000 vol./hr./vol. catalyst.

The effluent gaseous stream containing sulfur vapors is removed from the bottom of converter 17 at a temperature of about 950° F. and is passed through line 19 to sulfur condenser 21. Liquid sulfur is withdrawn from condenser 21 at about 275° F. and is passed through line 22 to storage, not shown.

If desired, condenser 21 may be operated at a lower temperature e. g. about 170° F., to condense both sulfur and water vapors, and the sulfur may subsequently be recovered from the water. The removal of both reaction products will facilitate increased conversion in the second converter.

The non-condensable gases containing unconverted hydrogen sulfide are removed from sulfur condenser 21 through line 23, admixed with additional air from line 24, and are passed to heat exchanger 27. The amount of air added through line 24 is about the stoichiometric quantity necessary for complete conversion of the remaining hydrogen sulfide to sulfur. Heated gases are withdrawn from heat exchanger 27 at a temperature of about 450° F. through line 28 and passed into converter 31. Converter 31 is similar to converter 17 but may be of smaller size.

The effluent gas containing sulfur vapors is removed from converter 31 at a temperature of about 800° F. and passed by means of line 32 into condenser 33. Liquid sulfur is withdrawn at a temperature of about 275° F. from condenser 33 through line 34 and sent to storage, not shown. The effluent gases from condenser 33 which are substantially free of hydrogen sulfide are passed through line 35 to further processing or for use as fuel.

Thus having described the invention, what is claimed is:

1. A process which comprises contacting a gaseous stream comprising hydrogen sulfide and hydrocarbons with a catalyst consisting essentially of an intimate mixture of a metal hydroxide selected from the group consisting of sodium and potassium and a metal oxide selected from the group consisting of magnesium, calcium and barium at a temperature of about 400° to 1200° F., in the presence of an oxidizing agent selected from the group consisting of free-oxygen and sulfur dioxide, wherein said oxidizing agent is employed in an amount between about 0.05 to 0.75 mol per mol of hydrogen sulfide contained in said gaseous stream.

2. The process of claim 1 wherein said gaseous stream is a sour natural gas.

3. The process of claim 1 wherein said gaseous stream contains appreciable amounts of olefins.

4. The process of claim 1 wherein said gaseous stream comprises essentially hydrogen, hydrogen sulfide and some hydrocarbons.

5. The process of claim 4 wherein said oxidizing agent is sulfur dioxide.

6. The process of claim 1 wherein said catalyst consists essentially of an intimate mixture of between about 5 to about 15% by weight of sodium hydroxide and between about 95 to about 85% by weight of calcium oxide.

7. A process which comprises contacting a gaseous stream comprising hydrogen sulfide and hydrocarbons with a soda lime catalyst in the presence of an oxidizing agent selected from the group consisting of free oxygen and sulfur dioxide to form vapors of sulfur, said oxidizing agent being employed in an amount between about 0.05 to 0.75 mol per mol of hydrogen sulfide contained in said gaseous stream and said catalyst being maintained at a temperature above the dew point of the sulfur vapors formed and below about 1200° F., and recovering sulfur from the effluent gaseous stream containing vapors of sulfur.

8. The process of claim 7 wherein said hydrocarbons are olefins.

9. The process of claim 7 wherein said gaseous stream is a sour refinery gas.

10. The process of claim 7 wherein said gaseous stream is a sour natural gas.

11. A process which comprises contacting a gaseous stream comprising hydrogen sulfide and hydrogen with a soda lime catalyst in the presence of sulfur dioxide to form vapors of sulfur, said catalyst being maintained at a temperature above the dew point of the sulfur vapors and below about 1200° F. and said sulfur dioxide being employed in an amount of about 0.05 to 0.75 mol per mol of hydrogen sulfide contained in said gaseous stream, and recovering sulfur from the effluent gaseous stream containing vapors of sulfur.

12. The process of claim 11 wherein said gaseous stream is a hydrogen recycle gas.

References Cited in the file of this patent

UNITED STATES PATENTS

| 2,110,240 | Rollen | Mar. 8, 1938 |
| 2,581,135 | Odell | Jan. 1, 1952 |

FOREIGN PATENTS

| 647,578 | France | Jan. 21, 1928 |
| 5,070 | Great Britain | 1883 |

OTHER REFERENCES

Perry: Chemical Engineers Handbook, pp. 2362–2364, McGraw Hill, New York, second edition, 1941.